United States Patent
Shen et al.

(10) Patent No.: US 10,572,663 B1
(45) Date of Patent: Feb. 25, 2020

(54) SYSTEMS AND METHODS FOR IDENTIFYING MALICIOUS FILE DROPPERS

(71) Applicant: Symantec Corporation, Mountain View, CA (US)

(72) Inventors: Yun Shen, Bristol (GB); Azzedine Benameur, Fairfaix, VA (US); Nathan Evans, Sterling, VA (US)

(73) Assignee: Symantec Corporation, Mountain View, CA (US)

( * ) Notice: Subject to any disclaimer, the term of this patent is extended or adjusted under 35 U.S.C. 154(b) by 221 days.

(21) Appl. No.: 15/064,633

(22) Filed: Mar. 9, 2016

(51) Int. Cl.
*G06F 21/56* (2013.01)

(52) U.S. Cl.
CPC .................. *G06F 21/562* (2013.01)

(58) Field of Classification Search
CPC ...... G06F 21/562; G06F 21/56; G06F 21/561; G06F 21/563; G06F 21/564; G06F 21/565; G06F 21/567; G06F 21/568; G06F 21/569; G06F 21/552; H04L 63/1416; H04L 63/1425
USPC .......................................................... 726/23
See application file for complete search history.

(56) References Cited

U.S. PATENT DOCUMENTS

| | | | | |
|---|---|---|---|---|
| 7,743,419 B1 * | 6/2010 | Mashevsky | ........... | G06F 21/552 713/187 |
| 8,572,740 B2 * | 10/2013 | Mashevsky | ............. | G06F 21/55 726/22 |
| 9,444,832 B1 * | 9/2016 | Ladikov | .............. | H04L 63/1416 |
| 9,998,484 B1 * | 6/2018 | Buyukkayhan | ....... | G06F 16/285 |
| 2010/0235913 A1 * | 9/2010 | Craioveanu | ........... | G06F 21/563 726/23 |
| 2014/0289853 A1 * | 9/2014 | Teddy | ................. | H04L 63/1416 726/23 |
| 2015/0235026 A1 * | 8/2015 | Klein | .................... | G06F 21/552 726/24 |

OTHER PUBLICATIONS

Carpenter; Matthew et.al, Hiding Virtualization from Attackers and Malware, 2007, IEEE Computer Society, p. 63, col. 1 (Year: 2007).*
Carpenter Matthew; et ,Hiding Virtualization from Attackers and Malware, IEEE, 2007 (Year: 2007).*

(Continued)

*Primary Examiner* — Ashokkumar B Patel
*Assistant Examiner* — William B Jones
(74) *Attorney, Agent, or Firm* — FisherBroyles, LLP (57) ABSTRACT

The disclosed computer-implemented method for identifying malicious file droppers may include (1) detecting a malicious file on the computing device, (2) constructing an ordered list of files that resulted in the malicious file being on the computing device where the malicious file is the last file in the ordered list of files and each file in the ordered list of files placed the next file in the ordered list of files on the computing device, (3) determining that at least one file prior to the malicious file in the ordered list of files comprises a malicious file dropper, and (4) performing a security action in response to determining that the file prior to the malicious file in the ordered list of files comprises the malicious file dropper. Various other methods, systems, and computer-readable media are also disclosed.

20 Claims, 7 Drawing Sheets

(56) References Cited

OTHER PUBLICATIONS

Luca Invernizzi et al., Nazca: Detecting Malware Distribution in Large-Scale Networks, https://www.cs.ucsb.edu/~vigna/publications/2014_NDSS_Nazca.pdf, Internet Society, NDSS '14, (Feb. 23-26, 2014).

Junjie Zhang et al., ARROW: Generating Signatures to Detect Drive-By Downloads, https://www.microsoft.com/en-us/research/wp-content/uploads/2016/02/zhangArrow.pdf, International World Wide Web Conference Committee (IW3C2), WWW 2011, (Mar. 28-Apr. 1, 2011).

Luca Invernizzi et al., EVILSEED: A Guided Approach to Finding MaliciousWeb Pages, https://www.cs.ucsb.edu/~vigna/publications/2012_SP_Evilseed.pdf, IEEE Computer Society, SP '12 Proceedings of the 2012 IEEE Symposium on Security and Privacy, (May 20-25, 2012).

Bum Jun Kwon et al., The Dropper Effect: Insights into Malware Distribution with Downloader Graph Analytics, https://www.umiacs.umd.edu/~tdumitra/papers/CCS-2015.pdf, CCS'15, (Oct. 12-16, 2015).

Zhou Li et al., Finding the Linchpins of the Dark Web: a Study on Topologically Dedicated Hosts on Malicious Web Infrastructures, https://www.emc.com/collateral/article/zhou-oakland13.pdf, IEEE Computer Society, SP '13 Proceedings of the 2013 IEEE Symposium on Security and Privacy, (May 19-22, 2013).

Christian Rossow et al., Large-Scale Analysis of Malware Downloaders, http://www.christian-rossow.de/publications/downloaders-dimva12.pdf, Springer-Verlag Berlin, Heidelberg, DIMVA'12 Proceedings of the 9th international conference on Detection of Intrusions and Malware, and Vulnerability Assessment, (Jul. 26-27, 2012).

Eduard Dmitriyev; Systems and Methods for Categorizing Processes as Malicious; U.S. Appl. No. 15/063,533, filed Mar. 8, 2016.

\* cited by examiner

SYSTEMS AND METHODS FOR IDENTIFYING MALICIOUS FILE DROPPERS

BACKGROUND

Viruses, Trojans, spyware, and other kinds of malware are a constant threat to any computing device that requires network connectivity. Many different types of security systems exist to combat these threats, ranging from browser plug-ins to virus scanners to firewalls, and beyond. Countless new instances and permutations of malware are created every day, requiring security systems to be constantly updated. Despite all this, many pieces of malware still manage to infect computing devices and carry out a variety of malicious actions. Some of these pieces of malware may even download other malicious files onto computing devices.

Unfortunately, traditional systems for identifying malicious files may rely on techniques that are quickly adapted to by attackers. For example, traditional systems that identify malicious files via signatures must have an appropriate signature in order to identify a malicious file and may not be effective unless frequently updated. Similarly, traditional systems that detect malicious files based on heuristics may be unable to identify malicious files that have not yet taken malicious actions. In addition, once a piece of malware is identified, traditional systems may not examine related files to determine whether those other files may also be malware. Accordingly, the instant disclosure identifies and addresses a need for additional and improved systems and methods for identifying malware.

SUMMARY

As will be described in greater detail below, the instant disclosure describes various systems and methods for identifying malicious file droppers by investigating files that placed known malicious files onto computing devices.

In one example, a computer-implemented method for identifying malicious file droppers may include (1) detecting a malicious file on the computing device, (2) constructing an ordered list of files that resulted in the malicious file being on the computing device, where the malicious file is the last file in the ordered list of files and each file in the ordered list of files placed the next file in the ordered list of files on the computing device, (3) determining that at least one file prior to the malicious file in the ordered list of files includes a malicious file dropper, and (4) performing a security action in response to determining that the file prior to the malicious file in the ordered list of files includes the malicious file dropper.

In some examples, the computer-implemented method may further include identifying an additional file that was placed on the computing device by the malicious file dropper and determining that the additional file includes an additional malicious file based on the additional file having been placed on the computing device by the malicious file dropper. Additionally or alternatively, the computer-implemented method may further include identifying an additional file that was placed on an additional computing device by an instance of the malicious file dropper located on the additional computing device and determining that the additional file includes an additional malicious file based on the additional file having been placed on the additional computing device by the instance of the malicious file dropper. In some embodiments, the computer-implemented method may further include sending information about the malicious file dropper to an anti-malware server.

In some examples, the computer-implemented method may further include determining that at least one file in the ordered list of files is not a malicious file dropper based on determining that the file is a known trusted file. In some examples, constructing the ordered list of files may include stopping construction of the ordered list of files upon identifying the first file in the ordered list of files that is a known trusted file. Additionally or alternatively, constructing the ordered list of files may include stopping construction of the ordered list of files upon identifying the first file in the ordered list of files that was not placed on the computing device by another file. In some embodiments, constructing the ordered list of files may include constructing a graph of files that placed other files on the computing device.

In one embodiment, a system for implementing the above-described method may include (1) a detection module, stored in memory, that detects a malicious file on the computing device, (2) a construction module, stored in memory, that constructs an ordered list of files that resulted in the malicious file being on the computing device, where the malicious file is the last file in the ordered list of files and each file in the ordered list of files placed the next file in the ordered list of files on the computing device, (3) a determination module, stored in memory, that determines that at least one file prior to the malicious file in the ordered list of files may include a malicious file dropper, (4) a security module, stored in memory, that performs a security action in response to determining that the file prior to the malicious file in the ordered list of files may include the malicious file dropper, and (5) at least one physical processor configured to execute the detection module, the construction module, the determination module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect a malicious file on the computing device, (2) construct an ordered list of files that resulted in the malicious file being on the computing device, where the malicious file is the last file in the ordered list of files and each file in the ordered list of files placed the next file in the ordered list of files on the computing device, (3) determine that at least one file prior to the malicious file in the ordered list of files includes a malicious file dropper, and (4) perform a security action in response to determining that the file prior to the malicious file in the ordered list of files includes the malicious file dropper.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for identifying malicious file droppers. As will be explained in greater detail below, by examining the list of files that resulted in a malicious file infecting a computing device, the systems described herein may be able to identify malicious file droppers and then identify further previously-unknown malicious files downloaded or created by those malicious file droppers.

Figure 1:
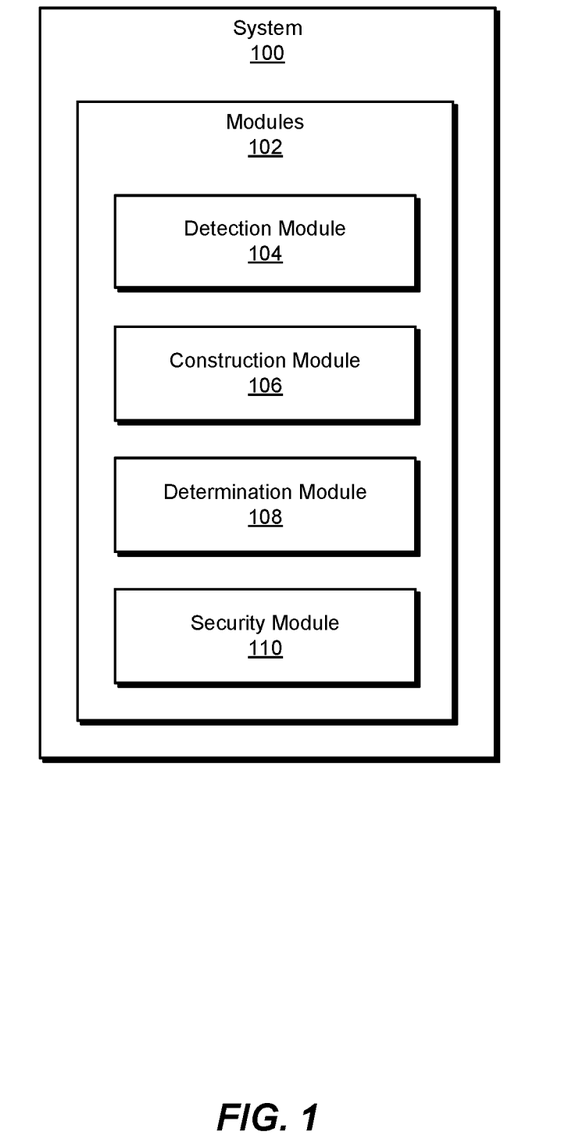
FIG. 1 is a block diagram of an exemplary system for identifying malicious file droppers.
Figure 2:
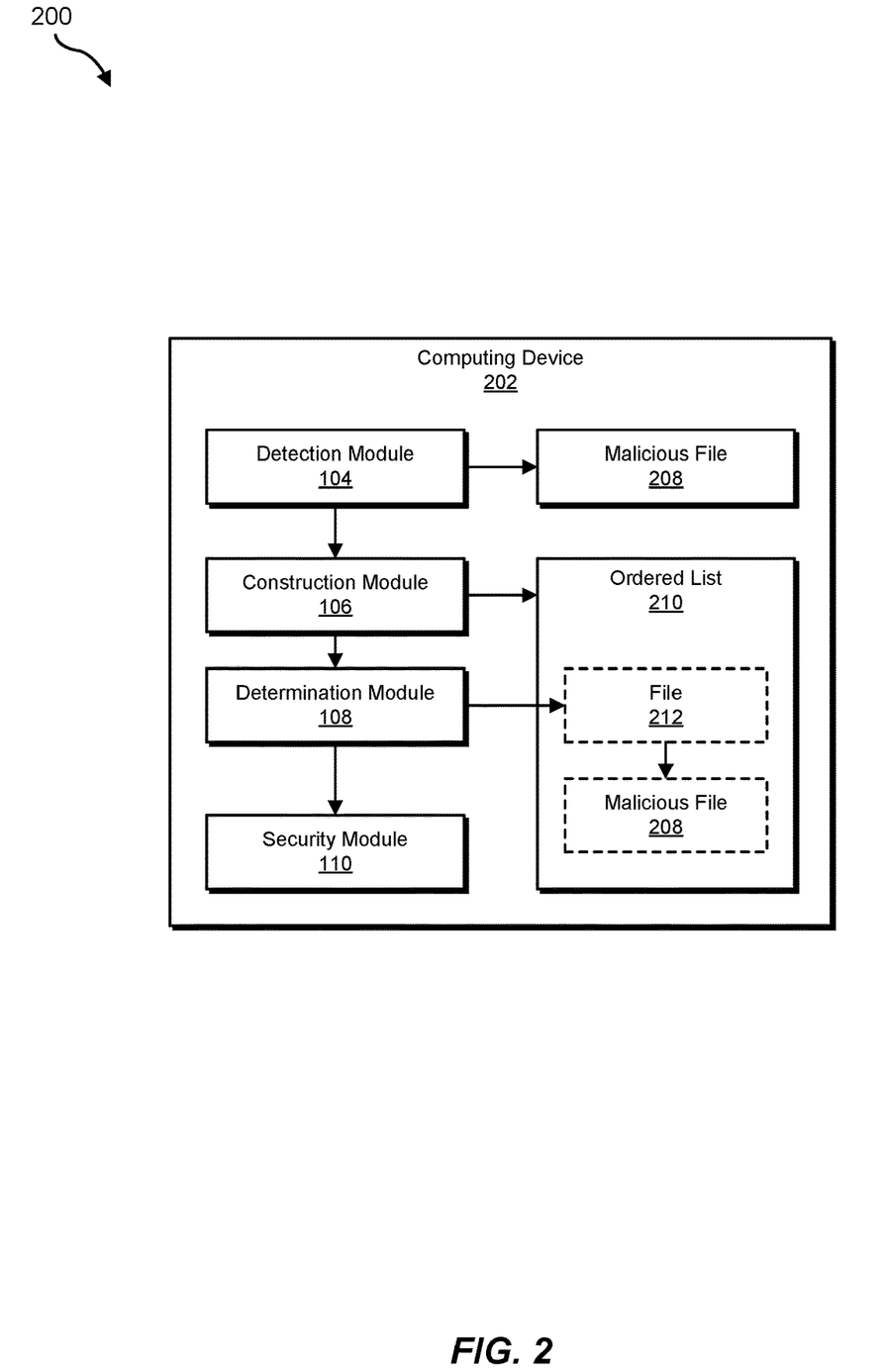
FIG. 2 is a block diagram of an additional exemplary system for identifying malicious file droppers.

The following will provide, with reference to FIGS. 1-2, detailed descriptions of exemplary systems for identifying malicious file droppers. Detailed descriptions of corresponding computer-implemented methods will also be provided in connection with FIG. 3. Detailed descriptions of exemplary ordered lists and graphs of files will be provided in connection with FIGS. 4 and 5, respectively. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for identifying malicious file droppers. As illustrated in this figure, exemplary system 100 may include one or more modules 102 for performing one or more tasks. For example, and as will be explained in greater detail below, exemplary system 100 may include a detection module 104 that detects a malicious file on the computing device. Exemplary system 100 may additionally include a construction module 106 that constructs an ordered list of files that resulted in the malicious file being on the computing device, where the malicious file is the last file in the ordered list of files and each file in the ordered list of files placed the next file in the ordered list of files on the computing device. Exemplary system 100 may also include a determination module 108 that determines that at least one file prior to the malicious file in the ordered list of files includes a malicious file dropper. Exemplary system 100 may additionally include a security module 110 that performs a security action in response to determining that the file prior to the malicious file in the ordered list of files includes the malicious file dropper. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. In one example, computing device 202 may be programmed with one or more of modules 102.

In one embodiment, one or more of modules 102 from FIG. 1 may, when executed by at least one processor of computing device 202, enable computing device 202 to identify malicious file droppers. For example, and as will be described in greater detail below, detection module 104 may detect a malicious file 208 on computing device 202. Construction module 106 may then construct an ordered list 210 of files that resulted in malicious file 208 being on computing device 202, where malicious file 208 is the last file in ordered list 210 and each file 212 in ordered list 210 placed the next file in ordered list 210 on computing device 202. Next, determination module 108 may determine that at least one file 212 prior to malicious file 208 in ordered list 210 may include a malicious file dropper. Immediately or at a later time, security module 110 may perform a security action in response to determining that file 212 prior to malicious file 208 in ordered list 210 includes a malicious file dropper.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Figure 3:
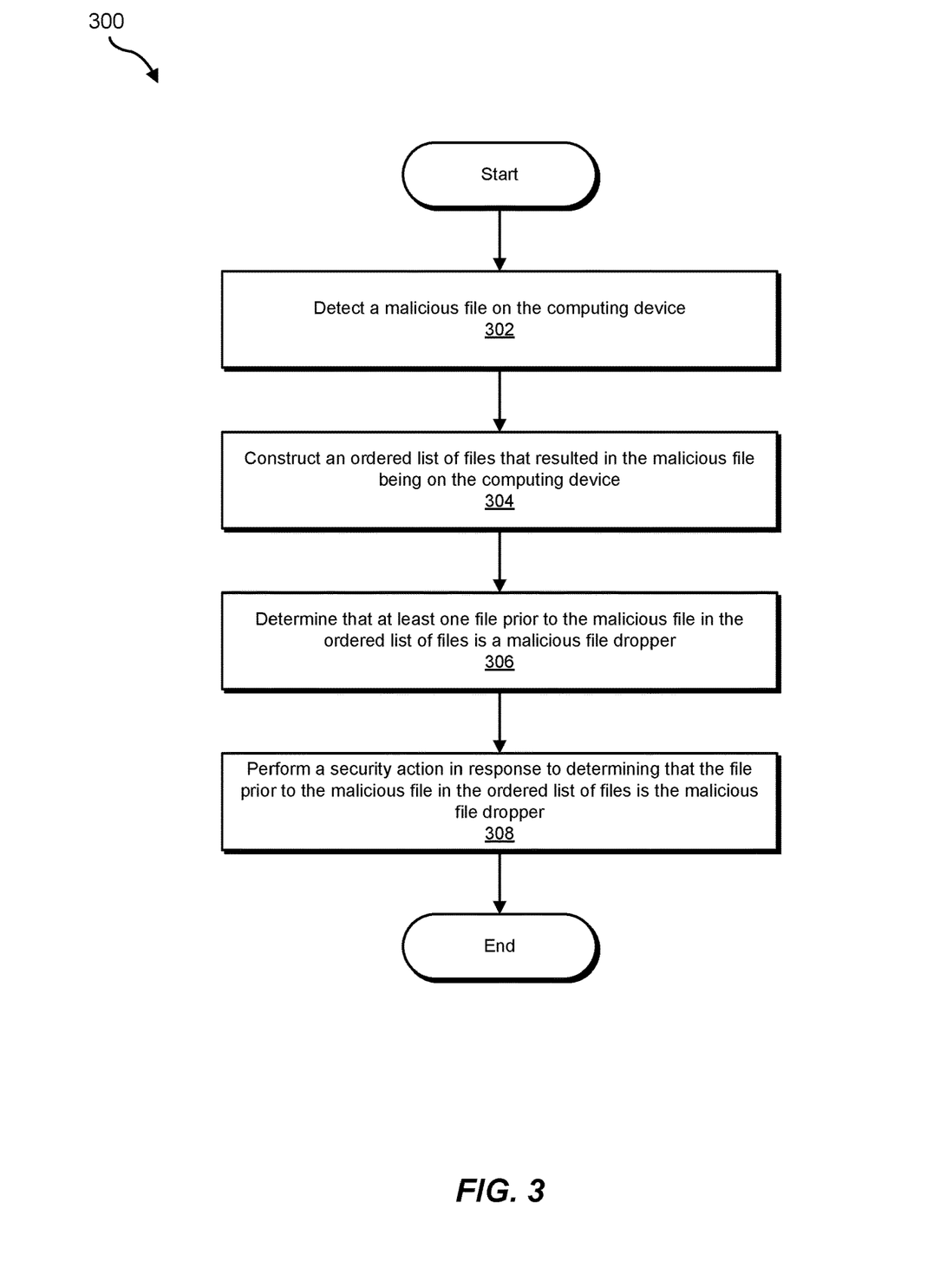
FIG. 3 is a flow diagram of an exemplary method for identifying malicious file droppers.

FIG. 3 is a flow diagram of an exemplary computer-implemented method 300 for identifying malicious file droppers. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may detect a malicious file on the computing device. For example, detection module 104 may, as part of computing device 202 in FIG. 2, detect malicious file 208 on computing device 202.

The term "malicious file," as used herein, generally refers to any file on a computing device that is capable or suspected of malicious behavior. In some examples, a malicious file may have already taken a malicious action, such as deleting another file. In other examples, a malicious file may be suspected of being malicious due to having a low reputation and/or trust score in a reputation database.

Detection module 104 may detect the malicious file in a variety of ways. For example, detection module 104 may detect the malicious file by using a heuristic to examine the malicious file's behavior. In another example, detection module 104 may look the malicious file up in a reputation database and determine that the malicious file has a low reputation score. Additionally or alternatively, detection module 104 may detect the malicious file by comparing the malicious file to a signature of a known malicious file. In some embodiments, detection module 104 may receive information about the malicious file from another application, such as an anti-malware application.

At step 304, one or more of the systems described herein may construct an ordered list of files that resulted in the malicious file being on the computing device, where the malicious file is the last file in the ordered list of files and each file in the ordered list of files placed the next file in the ordered list of files on the computing device. For example, construction module 106 may, as part of computing device 202 in FIG. 2, construct an ordered list 210 that resulted in malicious file 208 being on computing device 202, where malicious file 208 is the last file in ordered list 210 and each file 212 in ordered list 210 placed the next file in ordered list 210 on computing device 202.

The term "placed," as used herein, generally refers to any method of causing a file to be stored in a computing device. In some examples, a file may place another file on a computing device by downloading the file to the computing device. In other examples, a file may place another file on a computing device by creating the file on the computing device. Additionally or alternatively, a file may place another file on a computing device by copying the file to the computing device.

The term "ordered list of files," as used herein, generally refers to any representation of a set of files where each representation of a file points to at least one other representation of a file. An ordered list of files may be stored as a variety of data structures. For example, an ordered list of files may include a list, an array, a linked list, a graph, a heap, and/or a tree.

Construction module 106 may construct the ordered list of files in a variety of ways. In some embodiments, construction module 106 may use metadata about the malicious file in order to determine which file placed the malicious file on the computing device. For example, construction module 106 may use the "referrer URL," "parent_url," and/or "download_ip" metadata about the malicious file. Additionally or alternatively, construction module 106 may receive data from one or more file-tracking applications about which file placed which other file on the computing device.

In some examples, construction module 106 may stop construction of the ordered list of files upon identifying the first file in the ordered list of files that was not placed on the computing device by another file. For example, construction module 106 may determine that the file that downloaded the file that created the malicious file is a default part of the operating system that came installed with the computing device. In this example, the file that is the default part of the operating system may be the first file in the ordered list of files.

Additionally or alternatively, construction module 106 may stop construction of the ordered list of files upon identifying the first file in the ordered list of files that is a known trusted file. For example, construction module 106 may determine that the file that downloaded the file that downloaded the file that downloaded the malicious file is INTERNET EXPLORER, a known trusted file. In this example, INTERNET EXPLORER may be the first file in the ordered list of files.

Figure 4:
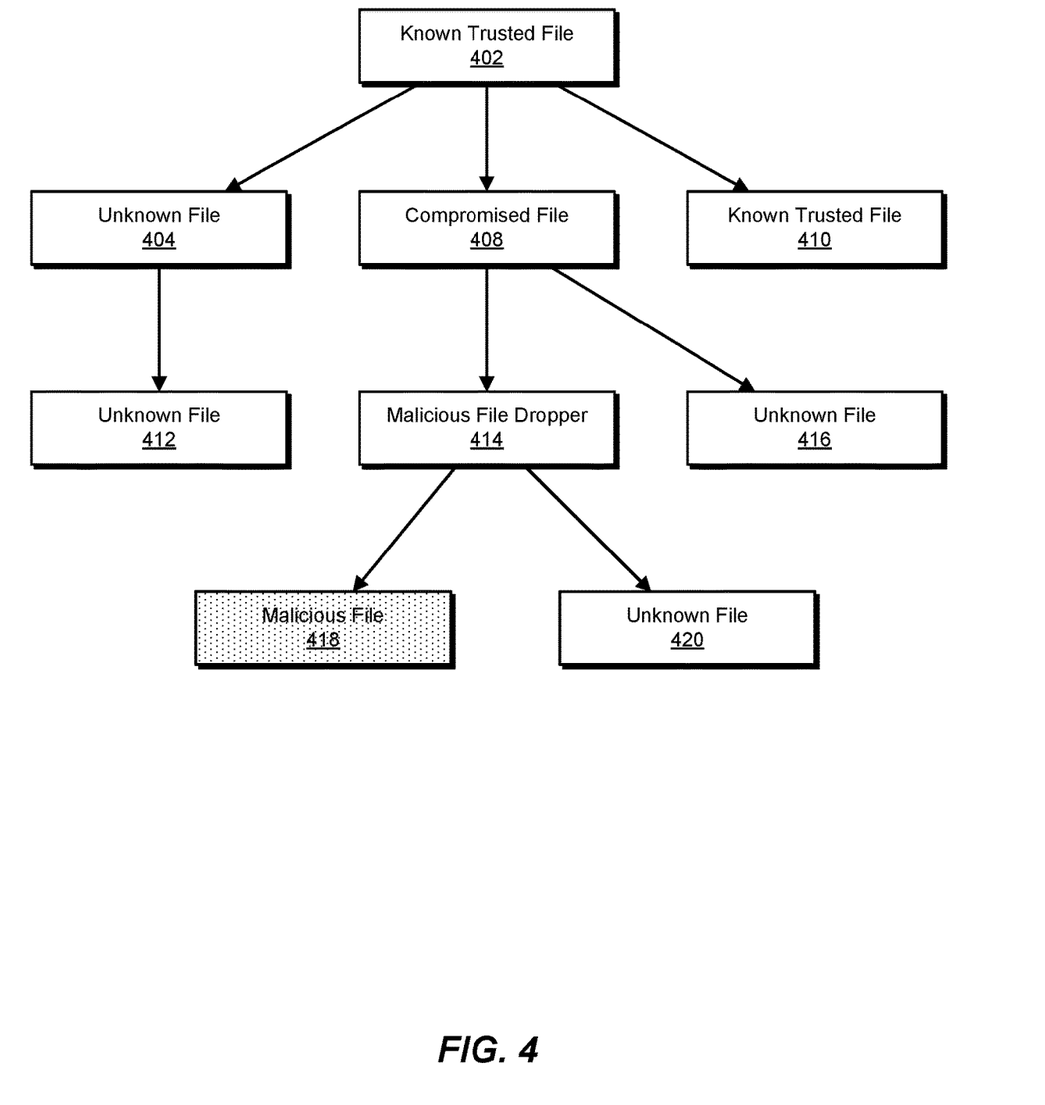
FIG. 4 is a block diagram of an exemplary set of ordered lists of files.

In some embodiments, construction module 106 may construct the ordered list of files by constructing a graph of files that placed other files on the computing device. In these embodiments, construction module 106 may determine which other files were placed on the computing device by files above the malicious file and may also determine which other files those files placed, and so on. For example, as illustrated in FIG. 4, construction module 106 may determine that a malicious file dropper 414 placed a malicious file 418 on a computing device. Construction module 106 may then determine that malicious file dropper 414 also placed an unknown file 420 on the computing device and/or that a compromised file 408 placed malicious file dropper 414 on the computing device. Construction module 106 may also determine that a known trusted file 402 placed compromised file 408 on the computing device and/or that compromised file 408 placed an unknown file 416 on the computing device. In some embodiments, construction module 106 may determine that known trusted file 402 placed a known trusted file 410 and/or an unknown file 404 on the computing device and/or that unknown file 404 placed an unknown file 412 on the computing device.

Returning to FIG. 3, at step 306, one or more of the systems described herein may determine that at least one file prior to the malicious file in the ordered list of files may include a malicious file dropper. For example, determination module 108 may, as part of computing device 202 in FIG. 2, determine that at least one file 212 prior to malicious file 208 in ordered list 210 may include a malicious file dropper.

The term "malicious file dropper," as used herein, generally refers to any file that is designed to place a malicious file on a computing device. In some embodiments, a malicious file dropper may download a malicious file to a computing device. In other embodiments, a malicious file dropper may create a malicious file on the computing device. In some examples, a malicious file dropper may also be capable of other malicious actions. For example, a malicious file dropper may listen for instructions from a command-and-control server about whether to download one or more malicious files, collect information from the computing device, and/or interfere with legitimate operations of the computing device.

Determination module 108 may determine that the file prior to the malicious file in the ordered list includes a malicious file dropper in a variety of ways. In some embodiments, determination module 108 may determine that any file that placed a malicious file on a computing device is a malicious file dropper. In other embodiments, determination module 108 may examine the file prior to the malicious file in the ordered list to determine whether the file has characteristics of being a malicious file dropper, such as a low reputation score.

In some examples, determination module 108 may determine that multiple files in the ordered list are malicious file droppers. For example, determination module 108 may determine that the malicious file dropper that downloaded the malicious file was itself downloaded by another malicious file dropper.

In some examples, determination module 108 may determine that at least one file in the ordered list of files is not a malicious file dropper based on determining that the file is a known trusted file. For example, determination module 108 may determine that a malicious file dropper was downloaded via GOOGLE CHROME, which may be a known trusted file and therefore may not be a malicious file dropper. In some embodiments, the systems described herein may have access to a predetermined list of known trusted files, such as a whitelist and/or a reputation database.

In some embodiments, determination module 108 may convict the entire ordered list of files. For example, if the first file in the ordered list is a standalone executable file that is not a known trusted file, determination module 108 may determine that every file in the ordered list is malicious.

At step 308, one or more of the systems described herein may perform a security action in response to determining that the file prior to the malicious file in the ordered list of files may include the malicious file dropper. For example, security module 110 may, as part of computing device 202 in FIG. 2, perform a security action in response to determining that file 212 prior to malicious file 208 in ordered list 210 may include the malicious file dropper.

Security module 110 may take a variety of security actions. For example, security module 110 may alert an administrator about the malicious file dropper. Additionally or alternatively, security module 110 may delete and/or quarantine the malicious file dropper. In some embodiments, security module 110 may send information about the malicious file dropper to an anti-malware server. For example, security module 110 may send the ordered list of files to an anti-malware server.

Figure 5:
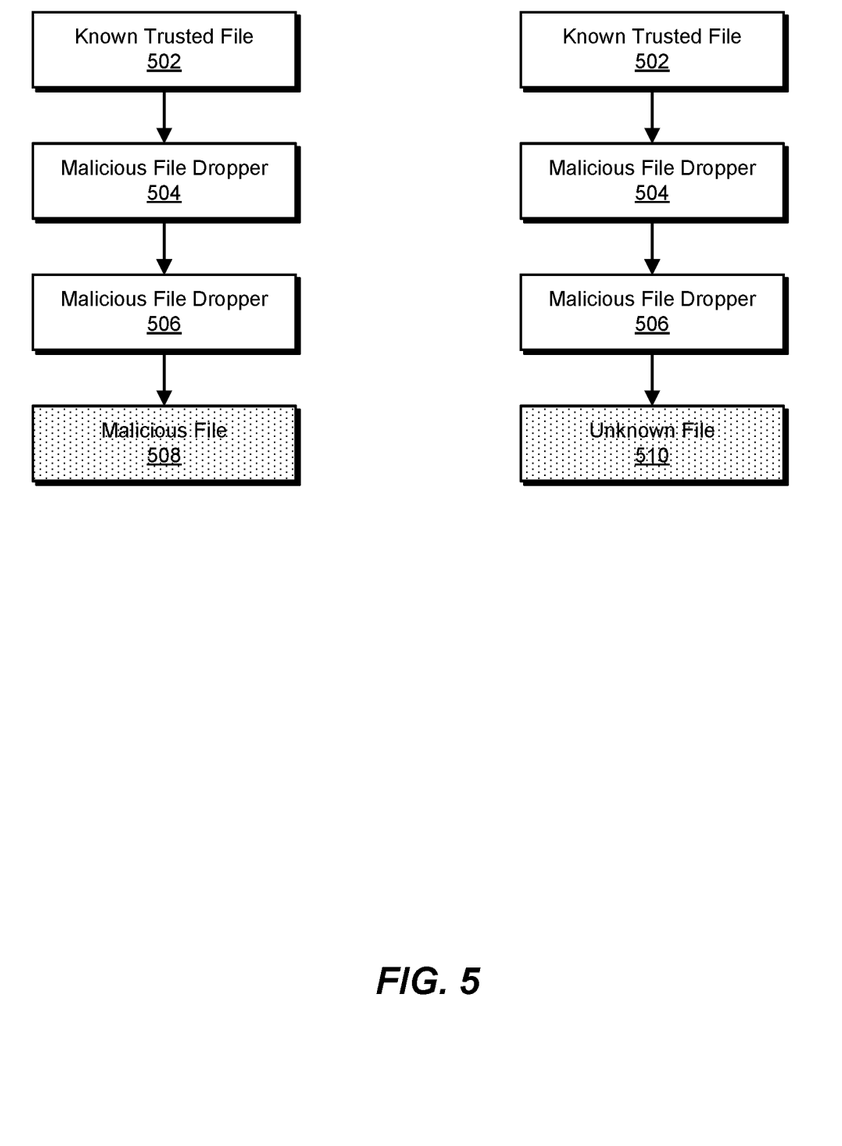
FIG. 5 is a block diagram of an exemplary graph of files.

In one example, security module 110 may identify an additional file that was placed on the computing device by the malicious file dropper and may determine that the additional file is an additional malicious file based on the additional file having been placed on the computing device by the malicious file dropper. For example, as illustrated in FIG. 5, a known trusted file 502 may have downloaded a malicious file dropper 504 to a computing device, which may in turn have downloaded a malicious file dropper 506 that created a malicious file 508. The systems described herein may detect malicious file 508 and then may construct the aforementioned ordered list of files. Later, security module 110 may identify unknown file 510. Security module 110 may then determine that unknown file 510 was placed on the computing device by malicious file dropper 506 and therefore unknown file 510 is likely to be a malicious file.

In some embodiments, unknown file 510 may be located on a different computing device than malicious file 508. In these embodiments, security module 110 on the additional computing device may receive information about malicious file droppers, such as ordered lists of files, from an anti-malware server. For example, security module 110 may receive information indicating that malicious file dropper 506 was observed to download malicious file 508 on another computing device. In this example, security module 110 may then convict unknown file 510 based on unknown file 510 having been downloaded by an instance of malicious file dropper 506.

In some embodiments, security module 110 may evaluate files based on a graph of files. Returning to FIG. 4, security module 110 may determine that unknown file 420 is a malicious file based on unknown file 420 having been created by malicious file dropper 414. In some embodiments, security module 110 may determine that a trusted file may have been compromised based on the trusted file having placed a malicious file and/or malicious file dropper on a computing device. For example, security module 110 may determine that compromised file 408 may be compromised based on compromised file 408 having downloaded malicious file dropper 414. Additionally, security module 110 may determine that unknown file 416 is suspicious and/or malicious due to unknown file 416 having been created by compromised file 408.

As described in connection with method 300 above, the systems and methods described herein may detect previously undetected malicious files based on first detecting malicious file droppers. First, the systems described herein may detect a malicious file. Next, the systems described herein may determine which file downloaded or created the malicious file, which file downloaded or created that file, and so on. The systems described herein may store this set of files in an ordered list, a graph, and/or another suitable data structure. The systems described herein may then determine which of the files upstream of the malicious file are malicious file droppers and/or compromised files. In some embodiments, the systems described herein may always convict the file immediately upstream of the malicious file unless that file is a known trusted file. The systems described herein may then convict any file that was downloaded or created by a file now known to be a malicious file dropper and/or a compromised file. In some embodiments, the systems described herein may be connected to one another across computing devices, for example via a security server, and thus may be able to convict files downloaded by malicious file droppers across multiple machines. By detecting malicious file droppers and convicting files downloaded or created by malicious file droppers, the systems described herein may be able to identify malware that would otherwise have remained undetected.

Figure 6:
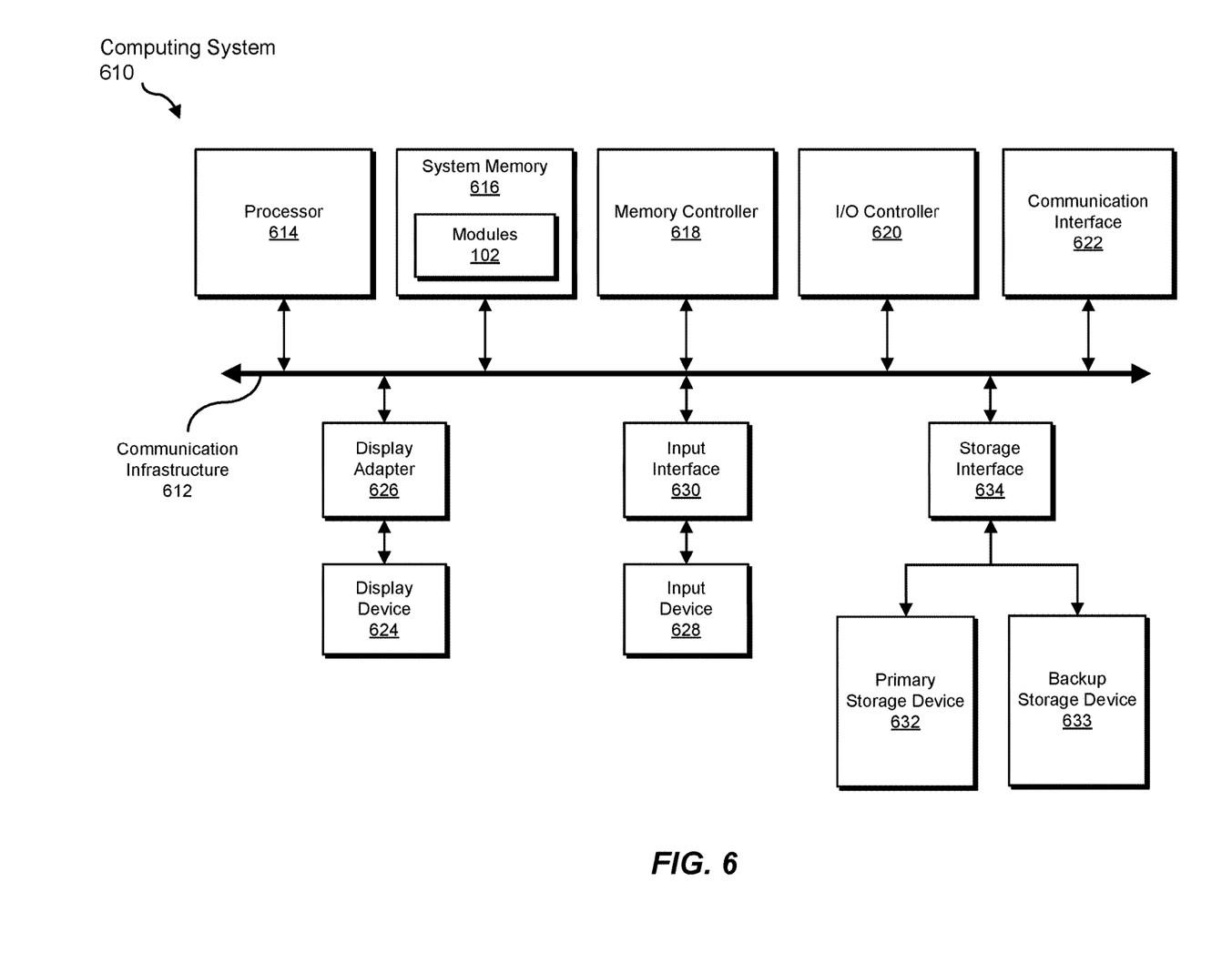
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
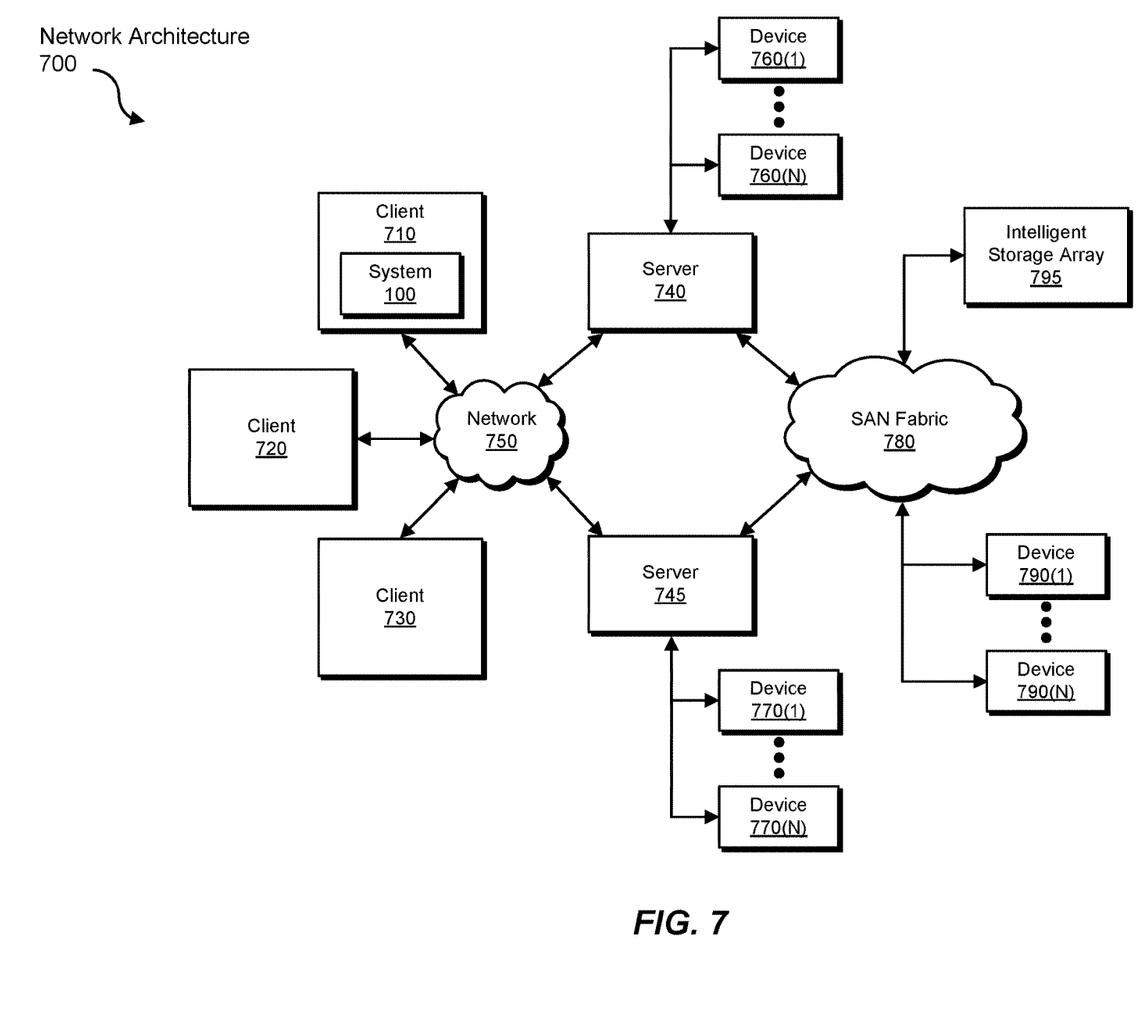
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for identifying malicious file droppers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive file data to be transformed, transform the file data, output a result of the transformation to a security application, use the result of the transformation to detect a malware dropper, and store the result of the transformation to a security application. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying malicious file droppers, at least a portion of the method being performed by a computing device comprising at least one processor, the method comprising:
   detecting, by a computing device, a malicious file on the computing device;
   constructing, by the computing device, an ordered list of files that resulted in the malicious file being on the computing device, wherein:
      the malicious file is the last file in the ordered list of files; and
      each file in the ordered list of files placed a next file in the ordered list of files on the computing device;
   determining, by the computing device, that a file prior to the malicious file in the ordered list of files comprises a malicious file dropper by determining that the prior file has malicious file dropper characteristics comprising referral uniform resource locator metadata, parent uniform resource locator metadata, and downloaded Internet Protocol metadata, wherein the determined metadata has a low reputation score in a reputation database, wherein the determined metadata is utilized to identify the prior file as having placed the malicious file on the computing device, and wherein the malicious file dropper was itself downloaded by another malicious file dropper; and
   performing, by the computing device, a security action in response to determining that the file prior to the malicious file in the ordered list of files comprises the malicious file dropper, the file prior to the malicious file comprising a trusted file, wherein the security action comprises:
      determining that the trusted file has been compromised based on the trusted file comprising the malicious file dropper that downloaded the malicious file; and
      deleting or quarantining the malicious file dropper on the computing device to prevent additional malicious files from being downloaded on the computing device.

2. The computer-implemented method of claim 1, further comprising:
   identifying an additional file that was placed on the computing device by the malicious file dropper;
   determining that the additional file comprises an additional malicious file based on the additional file having been placed on the computing device by the malicious file dropper.

3. The computer-implemented method of claim 1, further comprising:
   identifying an additional file that was placed on an additional computing device by an instance of the malicious file dropper located on the additional computing device;
   determining that the additional file comprises an additional malicious file based on the additional file having been placed on the additional computing device by the instance of the malicious file dropper.

4. The computer-implemented method of claim 1, further comprising sending information about the malicious file dropper to an anti-malware server.

5. The computer-implemented method of claim 1, further comprising determining that at least one file in the ordered list of files does not comprise the malicious file dropper based on determining that the file comprises a known trusted file.

6. The computer-implemented method of claim 1, wherein constructing the ordered list of files comprises stopping construction of the ordered list of files upon identifying a first file in the ordered list of files that comprises a file that was not placed on the computing device by another file.

7. The computer-implemented method of claim 1, wherein constructing the ordered list of files comprises stopping construction of the ordered list of files upon identifying a first file in the ordered list of files that comprises a known trusted file.

8. The computer-implemented method of claim 1, wherein constructing the ordered list of files comprises constructing a graph of files that placed other files on the computing device.

9. A system for identifying malicious file droppers, the system comprising:
   a detection module, stored in memory, that detects, by a computing device, a malicious file on the computing device;
   a construction module, stored in memory, that constructs, by a computing device, an ordered list of files that resulted in the malicious file being on the computing device, wherein:
      the malicious file is the last file in the ordered list of files; and
      each file in the ordered list of files placed a next file in the ordered list of files on the computing device;
   a determination module, stored in memory, that determines, by the computing device, that a file prior to the malicious file in the ordered list of files comprises a malicious file dropper by determining that the prior file has malicious file dropper characteristics comprising referral uniform resource locator metadata, parent uniform resource locator metadata, and downloaded Internet Protocol metadata, wherein the determined metadata has a low reputation score in a reputation database, wherein the determined metadata is utilized to identify the prior file as having placed the malicious file on the computing device, and wherein the malicious file dropper was itself downloaded by another malicious file dropper;
   a security module, stored in memory, that performs, by the computing device, a security action in response to determining that the file prior to the malicious file in the ordered list of files comprises the malicious file dropper, the file prior to the malicious file comprising a trusted file, wherein the security action comprises:
      determining that the trusted file has been compromised based on the trusted file comprising the malicious file dropper that downloaded the malicious file; and deleting or quarantining the malicious file dropper on the computing device to prevent additional malicious files from being downloaded on the computing device; and at least one physical processor configured to execute the detection module, the construction module, the determination module, and the security module.

10. The system of claim 9, wherein the security module:
identifies an additional file that was placed on the computing device by the malicious file dropper;
determines that the additional file comprises an additional malicious file based on the additional file having been placed on the computing device by the malicious file dropper.

11. The system of claim 9, wherein the security module:
identifies an additional file that was placed on an additional computing device by an instance of the malicious file dropper located on the additional computing device;
determines that the additional file comprises an additional malicious file based on the additional file having been placed on the additional computing device by the instance of the malicious file dropper.

12. The system of claim 9, wherein the security module sends information about the malicious file dropper to an anti-malware server.

13. The system of claim 9, wherein the determination module determines that at least one file in the ordered list of files does not comprise the malicious file dropper based on determining that the file by a known trusted file.

14. The system of claim 9, wherein the construction module constructs the ordered list of files by stopping construction of the ordered list of files upon identifying a first file in the ordered list of files that comprises a file that was not placed on the computing device by another file.

15. The system of claim 9, wherein the construction module constructs the ordered list of files by stopping construction of the ordered list of files upon identifying a first file in the ordered list of files that comprises a known trusted file.

16. The system of claim 9, wherein the construction module constructs the ordered list of files by constructing a graph of files that placed other files on the computing device.

17. A non-transitory computer-readable medium comprising one or more computer-readable instructions that, when executed by at least one processor of a computing device, cause the computing device to:
detect, by the computing device, a malicious file on the computing device;
construct, by the computing device, an ordered list of files that resulted in the malicious file being on the computing device, wherein:
the malicious file is the last file in the ordered list of files; and
each file in the ordered list of files placed a next file in the ordered list of files on the computing device;
determine, by the computing device, that a file prior to the malicious file in the ordered list of files comprises a malicious file dropper by determining that the prior file has malicious file dropper characteristics comprising referral uniform resource locator metadata, parent uniform resource locator metadata, and downloaded Internet Protocol metadata, wherein the determined metadata has a low reputation score in a reputation database, wherein the determined metadata is utilized to identify the prior file as having placed the malicious file on the computing device, and wherein the malicious file dropper was itself downloaded by another malicious file dropper; and
perform, by the computing device, a security action in response to determining that the file prior to the malicious file in the ordered list of files comprises the malicious file dropper, the file prior to the malicious file comprising a trusted file, wherein the security action comprises:
determining that the trusted file has been compromised based on the trusted file comprising the malicious file dropper that downloaded the malicious file; and
deleting or quarantining the malicious file dropper on the computing device to prevent additional malicious files from being downloaded on the computing device.

18. The non-transitory computer-readable medium of claim 17, wherein the one or more computer-readable instructions cause the computing device to:
identify an additional file that was placed on the computing device by the malicious file dropper;
determine that the additional file comprises an additional malicious file based on the additional file having been placed on the computing device by the malicious file dropper.

19. The non-transitory computer-readable medium of claim 17, wherein the one or more computer-readable instructions cause the computing device to:
identify an additional file that was placed on an additional computing device by an instance of the malicious file dropper located on the additional computing device;
determine that the additional file comprises an additional malicious file based on the additional file having been placed on the additional computing device by the instance of the malicious file dropper.

20. The non-transitory computer-readable medium of claim 17, wherein the one or more computer-readable instructions cause the computing device to send information about the malicious file dropper to an anti-malware server.

* * * * *